US 8,086,247 B2

(12) United States Patent
Kraufvelin et al.

(10) Patent No.: US 8,086,247 B2
(45) Date of Patent: Dec. 27, 2011

(54) SECURE USER PLANE LOCATION SESSION INITIATION IMPROVEMENT

(75) Inventors: Sebastian Kraufvelin, Tenhola (FI); Jarko Niemenmaa, Espoo (FI); Ville Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 805 days.

(21) Appl. No.: 12/098,331

(22) Filed: Apr. 4, 2008

(65) Prior Publication Data
US 2008/0254809 A1 Oct. 16, 2008

Related U.S. Application Data

(60) Provisional application No. 60/910,430, filed on Apr. 5, 2007.

(51) Int. Cl.
*H04W 24/00* (2009.01)
(52) U.S. Cl. .................. 455/456.1; 709/228; 370/395.5
(58) Field of Classification Search .................. 709/228; 725/25, 62
See application file for complete search history.

(56) References Cited

U.S. PATENT DOCUMENTS

| 2004/0120323 | A1* | 6/2004 | Viikari et al. ............ 370/395.5 |
| 2006/0225090 | A1* | 10/2006 | Shim et al. ............ 725/25 |
| 2007/0060097 | A1 | 3/2007 | Edge et al. |
| 2007/0096981 | A1* | 5/2007 | Abraham ............ 342/357.15 |
| 2007/0135089 | A1* | 6/2007 | Edge et al. ............ 455/404.1 |
| 2007/0238458 | A1* | 10/2007 | Shim ............ 455/433 |
| 2008/0133762 | A1* | 6/2008 | Edge et al. ............ 709/228 |
| 2008/0254809 | A1* | 10/2008 | Kraufvelin et al. ............ 455/456.1 |

FOREIGN PATENT DOCUMENTS

WO  WO-2006/118396  11/2006

OTHER PUBLICATIONS

International Search Report for PCT Application No. PCT/IB2008/051296 dated Jun. 24, 2009.
Guarino, B. "SUPL 2_ ULP INIT Message over UDP/IP," Open Mobile Alliance, Jul. 24, 2006, pp. 1-2.
OMA: "Secure User Plane Location Architecture," Announcement Open Mobile Alliance, Feb. 9, 2007, pp. 1-50.
Korean Office action for corresponding KR application No. 10-2009-7023069 dated Mar. 4, 2011, pp. 1-6.

* cited by examiner

*Primary Examiner* — Kent Chang
*Assistant Examiner* — Kashif Siddiqui
(74) *Attorney, Agent, or Firm* — Ditthavong Mori & Steiner, P.C.

(57) ABSTRACT

Systems and methods of sending a secure user plane location (SUPL) session initiation message from a location platform to a SUPL-enabled terminal are provided. When a network-based application has an internet protocol (IP) connection with the SUPL-enabled terminal using general packet radio service (GPRS) and needs location information regarding the SUPL-enabled terminal, the network-based application indicates an available GPRS session in mobile location protocol standard location immediate request. The location platform uses an application server hosting the network-based application to request starting a SUPL-enabled terminal-initiated location procedure. Alternatively, the location platform can determine whether a SUPL-enabled terminal has an active IP connection from an authentication, authorization, and accounting server. The IP address of the SUPL-enabled terminal is returned to the location platform, upon which a SUPL session initiation message is sent to an associated GPRS Gateway Support Node. User Datagram Protocol is utilized instead of Wireless Datagram Protocol.

24 Claims, 6 Drawing Sheets

SECURE USER PLANE LOCATION SESSION INITIATION IMPROVEMENT

FIELD OF THE INVENTION

The present invention relates generally to the field of mobile device location services. More particularly, the present invention relates to the sending of a Secure User Place Location (SUPL) session initiation message.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Location services can refer to those services which are based upon the location of a mobile device. Conventional location services (LCS) architectures can be divided into two categories, i.e., control plane architecture and user plane architecture, according to the type of communications engaged in between relevant elements. In a control plane architecture, location determination can be done according to $3^{rd}$ Generation Partnership Project (3GPP) standards using embedded signaling protocols. In addition, 3GPP standards can also involve the use of a base station subsystem (BSS)-centric architecture. Other methods of location determination are based on a network subsystem (NSS)-centric architecture, although more recent 3GPP standards releases, e.g., rel4, no longer employ the NSS-centric solution. Alternatively, a user plane architecture can be characterized as an overlay solution. In other words, a data connection on a user plane between a relevant server and a terminal is used to transfer radio interface information, satellite information, and/or other information needed to determine location.

The Open Mobile Alliance (OMA) standardization organization has introduced a scheme which can be referred to as Secure User Plane Location (SUPL). As discussed in the OMA Secure User Plane Architecture Candidate Version 1.0 document which can be found at http://member.openmobilealliance.org/ftp/Public_documents/LOC/Permanent-_docum ents/OMA-AD-SUPL-V1_0-20070122-C.zip and the OMA UserPlane Location Protocol Draft Version 2.0 document which can be found at http://member.openmobilealliance.org/ftp/Public_documents/LOC/Permanent-_docum ents/OMA-TS-ULP-V2_0-20070220-D.zip, SUPL can utilize user plane data bearers to provide for the transferring of location information. In addition, SUPL can utilize user plane data bearers to carry positioning technology-related protocols between an SUPL enabled terminal (SET) and a network in which the SET is operational. The location information can be utilized to compute the location of a SET.

A SUPL session can be initiated either by a SET or by the network. FIG. 1 illustrates a conventional signaling sequence for a network-initiated location request. It should be noted that network initiated services are services which originate from within a SUPL network. It may also be noted that for network initiated services, a SUPL agent 100 resides in the network, where the SUPL agent 100 can refer to one or more service access points which access network resources to obtain location information. In addition, for network initiated services, a SUPL location platform (SLP) and the SET can support various functions and/or messaging, including, for example: SUPL INIT, i.e., a message used by the SLP to initiate a SUPL session with the SET, which can include session-id, positioning method, and SLP mode information; and SUPL POS INIT, i.e., a message which can be used by the SET in initiating a positioning protocol session with the SLP that can include session-id, location identifier (lid), and SET capabilities information. In addition, SUPL POS, i.e., a message which can be used between the SLP and the SET to exchange a positioning procedure that can include session-id information and positioning process messages, e.g., Radio Resource LCS Protocol (RRLP)/Radio Resource Control (RRC)/TIA-801 messages; and SUPL END, i.e., a message for ending an existing SUPL session which can include session-id information are also supported. It should be noted that the SLP is a network entity that can be responsible for SUPL service management and position determination.

As shown in FIG. 1, an SUPL agent 100 issues a Mobile Location Protocol (MLP) Standard Location Immediate Request (SLIR) message to a Home-SLP (H-SLP) 110 with which the SUPL agent 100 is associated. The H-SLP 110 can authenticate the SUPL agent 100 to determine if the SUPL agent 100 is authorized for a service it requests, based on a received client-id. In addition, based on a received ms-id, the H-SLP 110 can apply subscriber privacy against the client-id. It can also be determined whether a previously computed position which meets a requested quality of position (QoP) is available at the H-SLP 110. The H-SLP 110 can also verify that the target SET 120 is currently not SUPL roaming and supports SUPL. The H-SLP 110 can initiate a location session with the target SET 120 using the SUPL INIT message, which can be a Wireless Application Protocol (WAP) PUSH or a Short Message Service (SMS) Trigger. When the SUPL INIT message is received by the target SET 120, it can either attach itself to a packet data network if it is not attached at the time or establish a circuit switched data connection. In addition, the target SET 120 can use additional parameters to determine if the SUPL INIT message is authentic.

The target SET 120 can evaluate notification rules, follow any appropriate actions, and can check the proxy/non-proxy mode indicator to determine if the H-SLP 110 uses a proxy or non-proxy mode. If a proxy mode is used, the target SET 120 can establish a secure Internet Protocol (IP) connection to the H-SLP 110 using an SLP address that has been provisioned by the home network to the target SET 120. The target SET 120 can then send a SUPL POS INIT message to start a positioning session with the H-SLP 110. If a coarse position calculated based on information received in the SUPL POS INIT message is available that meets the required QoP, the H-SLP 110 need not engage in a SUPL POS session. Otherwise, the H-SLP 110 then calculates the position estimate based on the received positioning measurements (SET-Assisted) or the target SET 120 calculates the position estimate based on assistance obtained from the H-SLP 110 (SET-Based).

Once the position calculation is complete, the H-SLP 110 sends the SUPL END message to the target SET 120 informing it that no further positioning procedure will be started and that the location session is finished. The target SET 120 can then release the secure IP connection to the H-SLP 110 and release all resources related to that session. The H-SLP 110 then sends the position estimate back to the SUPL agent 100 by means of a MLP Standard Location Immediate Answer (SLIA) message and the H-SLP 110 can release all resources related to the session.

FIG. 2 illustrates a conventional signaling sequence for a SET-initiated location request. It should be noted that in a SET-initiated location request, a SUPL agent can reside within the SET. As shown in FIG. 2, the SUPL agent 200 issues an MLP SLIR message to a SUPL location center (SLC) 204 with which the SUPL agent 200 is associated. The SLC 204 can coordinate SUPL operations and can authenticate the SUPL agent 200 and determine whether the SUPL agent 200 is authorized for the service it requests, based on the client-id received. Furthermore, based on the received ms-id, the SLC 204 can apply subscriber privacy against the client-id. If a previously computed position which meets the requested QoP is available at the SLC 204 and no notification and verification is required, the SLC 204 can send a position estimate back to the SUPL agent 200 in a MLP SLIP message. If notification and verification or notification only is required, then the SLC 204 can verify that the target SET 220 is currently not SUPL roaming and that the target SET 220 supports SUPL.

It should be noted that the SLC 204 and a SUPL positioning center (SPC) 208 may exchange information necessary to setup the SUPL POS session. The SLC 204 initiates the location session with the target SET 220 using the SUPL INIT message, which, as described above can be a WAP PUSH or an SMS Trigger. The SUPL INIT message can contain at least session-id information, an address of the SPC 208, aproxy/non-proxy mode indicator, a Key Id, a MAC and the intended positioning method. The SUPL INIT can also contain the desired QoP. If the result of the privacy check indicates that notification or verification to the target subscriber is needed, the SLC 204 can also include a notification element in the SUPL INIT message. The Key-Id corresponds to the MAC_Master_Key, which can be used to verify that the SUPL INIT message is authentic.

If the SLC 204 decides to use a previously computed position, the SUPL INIT message can indicate this in a 'no position' posmethod parameter value and the target SET 220 can respond with a SUPL END message carrying the results of the verification process (access granted, or access denied). If no explicit verification is required (notification only) the target SET 220 can respond with a SUPL END message and the SLC 204 can send a position estimate back to the SUPL agent 200 in a MLP SLIP message.

Furthermore, the target SET 220 can use the address provisioned by the home network to establish a secure IP connection to the SLC 204. The target SET 220 then checks the proxy/non-proxy mode indicator to determine if the H-SLP uses proxy or non-proxy mode. In the even that a non-proxy mode is used, the target SET 220 can send a SUPL AUTH REQ message to the SLC 204. The SUPL AUTH REQ message can contain session-id, key-id 2 and SET nonce information, where the key-id 2 corresponds to a PP2_SPC_Master_key to generate PSK_SPC_Key which is used for a PSK-Transport Layer Security (TLS) session between the SPC 204 and the target SET 220. The SLC 204 uses the key-id 2 and set nonce to create a key to be used for mutual SPC/SET authentication. The SLC 204 forwards the created key to the SPC 208 through internal communication and returns a SUPL AUTH RESP message to the target SET 220. The SUPL AUTH RESP message can contain the session-id.

The target SET 220 can evaluate the notification rules and follow the appropriate actions, while establishing a secure IP connection to the SPC 208 according to the received address. The target SET 220 and H-SLP 210 perform mutual authentication and the target SET 220 sends a SUPL POS INIT message to start a positioning session with the SPC 208. The SET can send the SUPL POS INIT message even if the SET supported positioning technologies do not include the intended positioning method indicated in the SUPL INIT message. The SUPL POS INIT message can contain at least a session-id, SET capabilities and lid. The target SET 220 can then provide its position, if this is supported. Otherwise, the target SET 220 can set the Requested Assistance Data element in the SUPL POS INIT message. Thereafter, the target SET 220 can release the IP connection to the SLC 204 and release all resources related to the session.

Alternatively, the SLC 204 and the SPC 208 can collaborate to determine an initial position of the target SET 220 to aid in the position determination process. If the initial position calculated based on information received in the SUPL POS INIT message meets the requested QoP, the SPC 208 can directly engage in a SUPL POS session. Based on the SUPL POS INIT message which includes the posmethod(s) supported by the target SET 220, the SPC 208 can determine the posmethod. If required for the posmethod, the SPC 208 can use the supported positioning protocol (e.g., RRLP, RRC, TIA-801) from the SUPL POS INIT message. In addition, the target SET 220 and the SPC 208 exchange several successive positioning procedure messages. The SPC 208 then calculates the position estimate based on the received positioning measurements (SET-Assisted) or the target SET 220 calculates the position estimate based on assistance obtained from the SPC 208 (SET-Based).

Once the position calculation is complete, the SPC 208 can send the SUPL END message to the target SET 220 informing it that no further positioning procedure will be started and that the SUPL session is complete, whereupon the target SET 220 can release the secure IP connection to the SPC 208 and release all resources related to the session. The SPC 208 informs the SLC 2047 about the end of the SUPL session. Unless the SLC 204 already knows the position, e.g., from a prior determination, the SPC 208 informs the SLC 204 of the determined position and the SPC 208 can release all resources related to this session. Lastly, the SLC 204 sends the position estimate back to the SUPL agent 200 an MLP SLIA message. The SLC 204 can then release all resources related to the session.

As described above in the case of network-initiated location requests, the conventional SUPL architecture sends a session initiation message, e.g., SUPL INIT message, using SMS or WAP according to the OMA SUPL standard. However, sending the session initiation message in this manner can take an inordinate amount of time. For example, an SMS message can be delayed more than thirty seconds. In addition, the mere conventional sending of SMS messages already causes a 10 second delay before session initialization can commence. Therefore, the process of session initialization can be faster through the use of alternate methods. It should be noted that references to ST2, UT2, UT3, and UT4 can refer to timers/time periods between which various signaling messages are to be sent/received.

SUMMARY OF THE INVENTION

Various embodiments provide a system and method of sending a SUPL session initiation message from a SLP to an SET. In the event that a network-based application has established an IP connection with the SET using GPRS and needs location information regarding the SET, the network-based application can include an indication of available GPRS session in an MLP SLIR. The SLP can then use an application server hosting the network-based application to send a request to start a SET-initiated location procedure. Alternatively, the SLP can determine whether an SET has an active IP connection from an authentication, authorization, and accounting server. The IP address of the SET can be returned to the SLP and the SLP can send a SUPL INIT message to an associated GPRS Gateway Support Node. User Datagram Protocol can then be utilized instead of Wireless Datagram Protocol.

When transmitting SUPL initiation messages from a SLP to a SET in accordance with various embodiments, a faster SUPL procedure results, which in turn results in faster location information delivery in the case of network-initiated SUPL location requests. In addition, a user's experience is enhanced. Various embodiments can be realized as software-only implementations, as opposed to features necessitating hardware modification/implementation.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
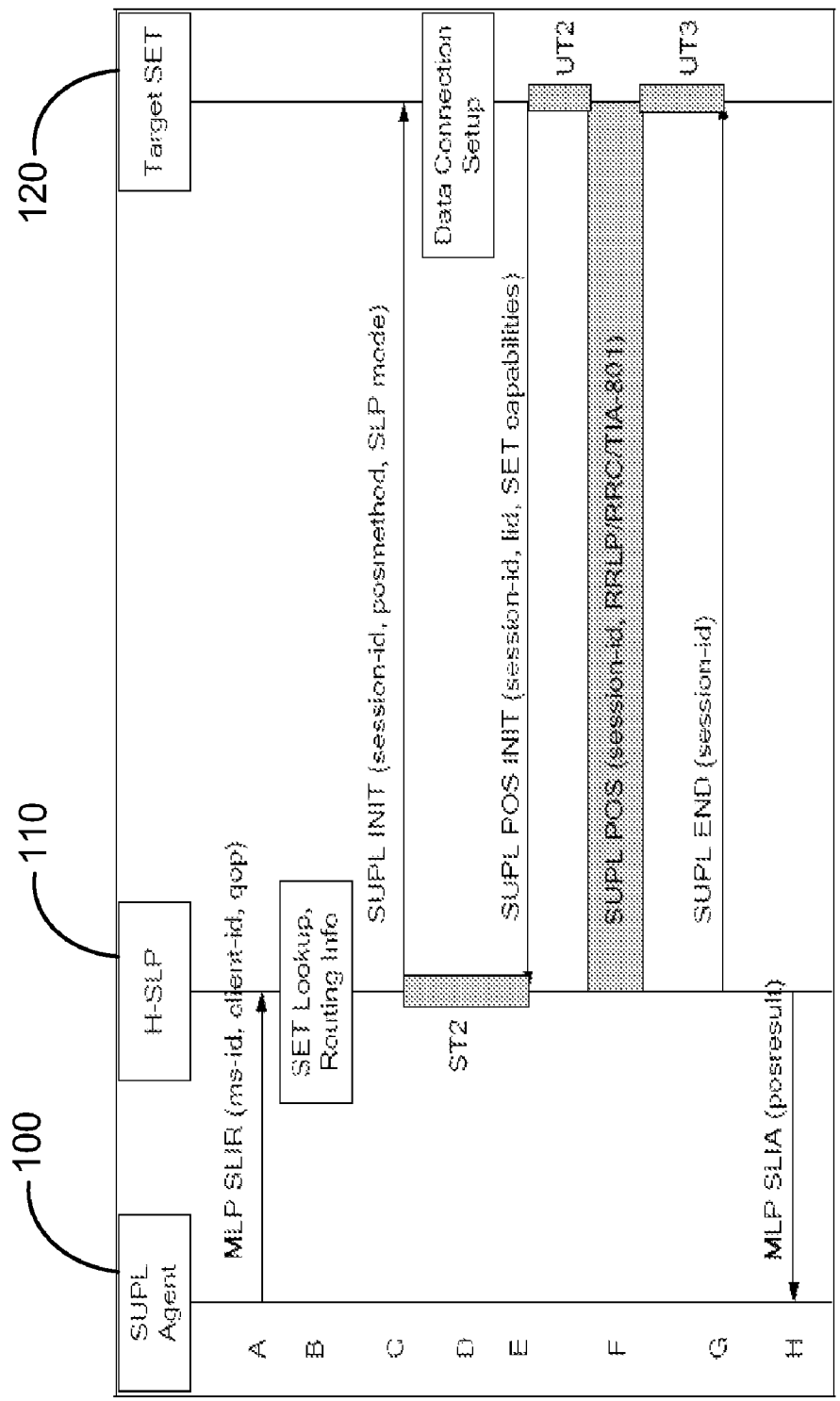
FIG. 1 is an illustration of a signaling sequence involving a network-initiated location request scenario.
Figure 2:
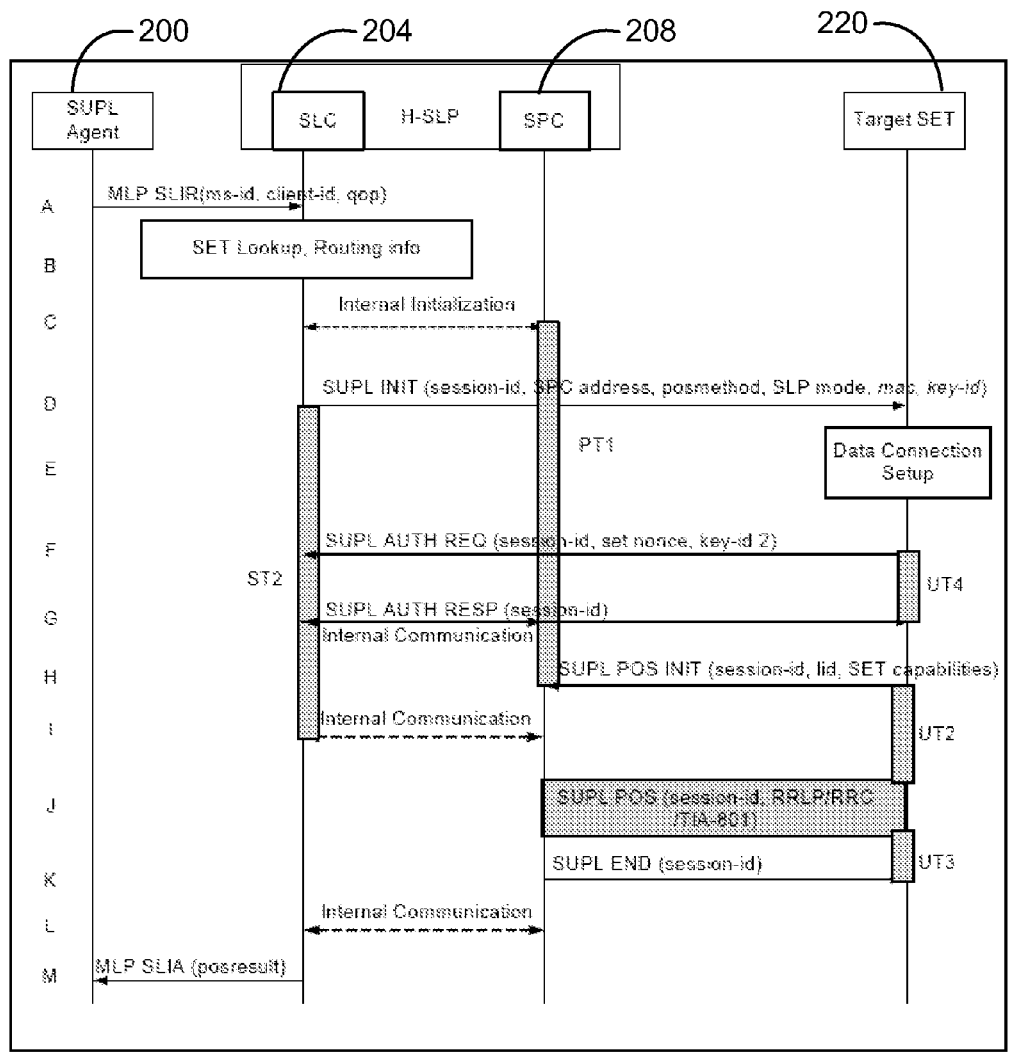
FIG. 2 is an illustration of a signaling sequence involving a SET-initiated location request scenario.
Figure 3:
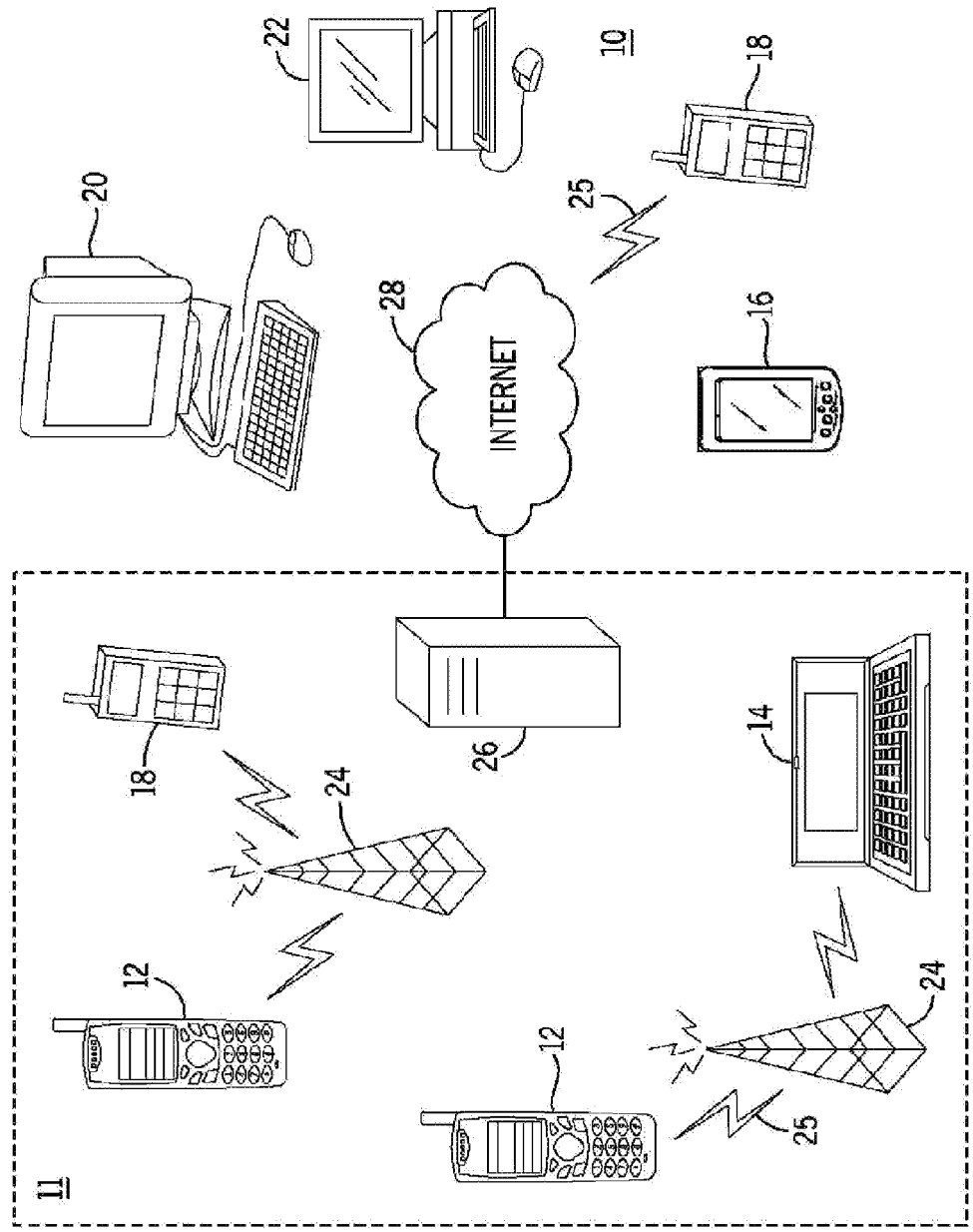
FIG. 3 is an overview diagram of a system within which the present invention may be implemented.

FIG. 3 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 3 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile device 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 4:
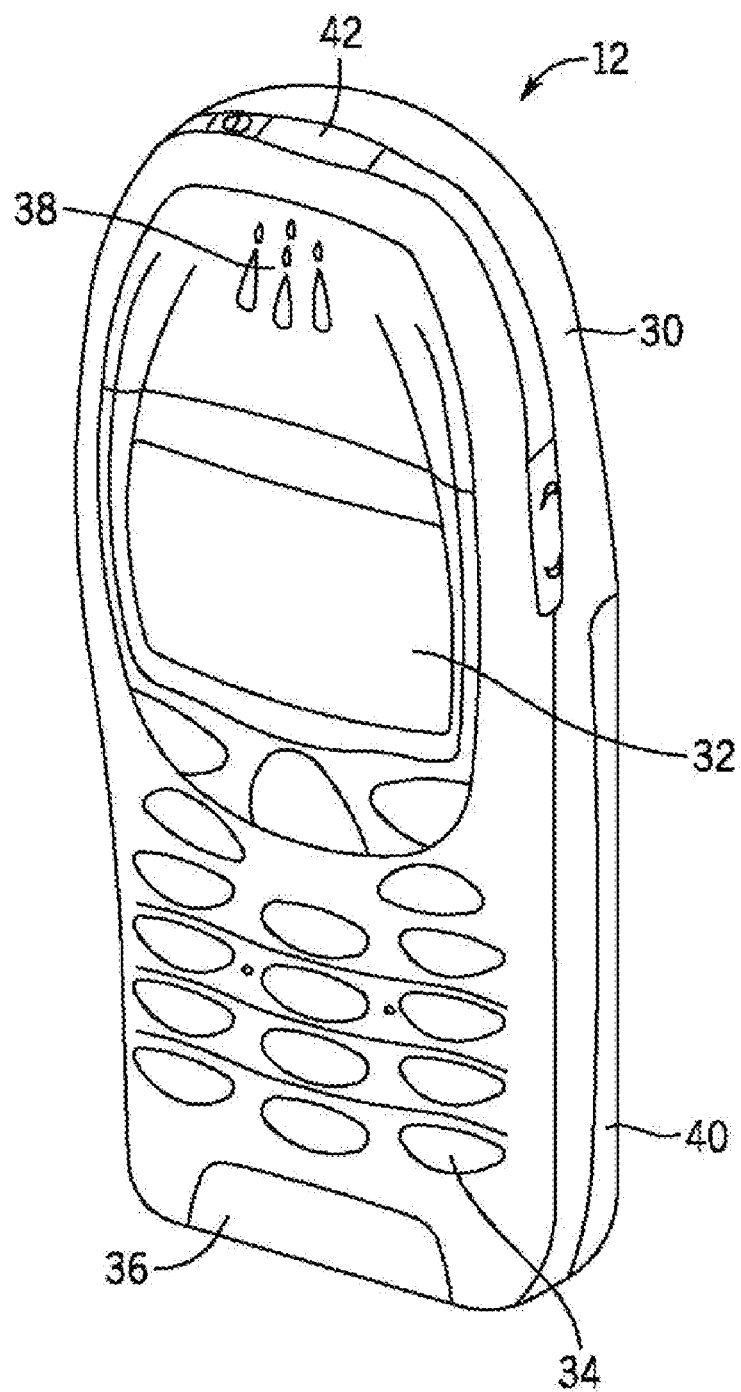
FIG. 4 is a perspective view of a mobile telephone that can be used in the implementation of the present invention.
Figure 5:
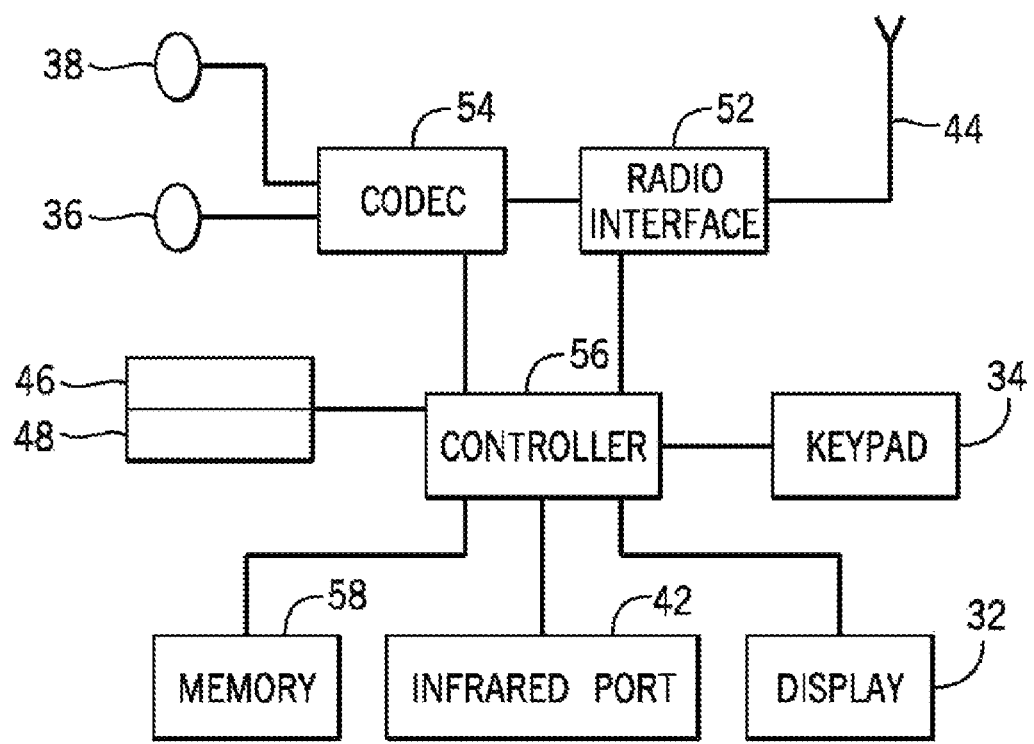
FIG. 5 is a schematic representation of the telephone circuitry of the mobile telephone of FIG. 4.

FIGS. 4 and 5 show one representative mobile device 12 within which the present invention may be implemented. It should be understood, however, that the present invention is not intended to be limited to one particular type of electronic device. The mobile device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

As noted above, a need exists for increasing the speed of transmitting a SUPL INIT message from an SLP to a SET. Therefore, various embodiments described in greater detail below can be utilized when a network-based application needing location information has established an IP connection with a SET using services including, but not limited to, General Packet Radio Service (GPRS) (for application-level purposes).

According to one embodiment, the network-based application can include an indication of available GPRS sessions in a MLP SLIR message. Such an indicator can be utilized to inform an SLP of an available GPRS connection between a LCS, e.g., the network-based application, and a SET. In turn, the SLP can use an application server, such as the application server hosting the LCS, as a proxy to send a request to the terminal to start a SET-initiated location procedure with the SLP. The request can be a SUPL INIT message. Utilizing such an approach to transmitting a SUPL INIT message can require changes in technical specifications (e.g., OMA MLP and OMA SUPL), as well as changes in the SET.

Furthermore, when a position of the SET has been determined, certain options are available. According to one option, the SET can send another Hypertext Transfer Protocol (HTTP)/WAP request, where the HTTP/WAP request includes position information. The HTTP/WAP request can be sent to the application server and the LCS can be completed, for example, as according to the WAP Location Frame Work. According to another option, the request to start the SET-initiated location procedure sent by the SLP, as described above, can include a request to deliver location information to a third party, e.g, the application server. It should be noted that delivering location information to a third party has been established as a candidate feature in the OMA SUPL 2.0 standard.

According to another embodiment, the SLP can determine from an authentication, authorization, and accounting (AAA) server whether the SET has an active IP connection. If an active IP connection exists, the IP address of the SET is returned to the SLP. Thereafter, the SLP sends a SUPL INIT message directly to a GPRS Gateway Support Node (GGSN) to commence a SET-initiated location procedure with the SLP. As described above, the position of the SET can then be determined. That is, the messages from an SLP server to a certain port of the SET can be allowed by any firewall on/within the path. Therefore, in practice, User Datagram Protocol (UDP) is used instead of Wireless Datagram Protocol (WDP), which is utilized in conventional SMS-based SUPL INIT delivery. Using UDP, short messages sometimes known as datagrams can be sent between elements/nodes on a network. Due to the nature of UDP, e.g, no packet checking overhead, UDP can be a fast and efficient transmission scheme. It may be noted that no changes to the OMA SUPL standard specifications are necessary, although architectural definitions can be provided.

Therefore, when a target SET is accessing a LCS over a browsing session, for example, a Packet Data Protocol (PDP) context has already been established and the SET has an allocated IP address. The IP address can then be provided to the SLP, which can be accomplished as described above in accordance with various embodiments. Hence, the IP address of the SET can be conveyed in the location request, e.g., the MLP SLIR message, according to one embodiment, whereas the IP address can be resolved directly from an AAA server according another embodiment. It should be noted that other networks, network elements, etc., may exist between the SET and the SLP. However, the SLP can be configured to resolve a public IP address into a private IP address via an authentication, authorization, and accounting (AAA) server, for example.

Figure 6:
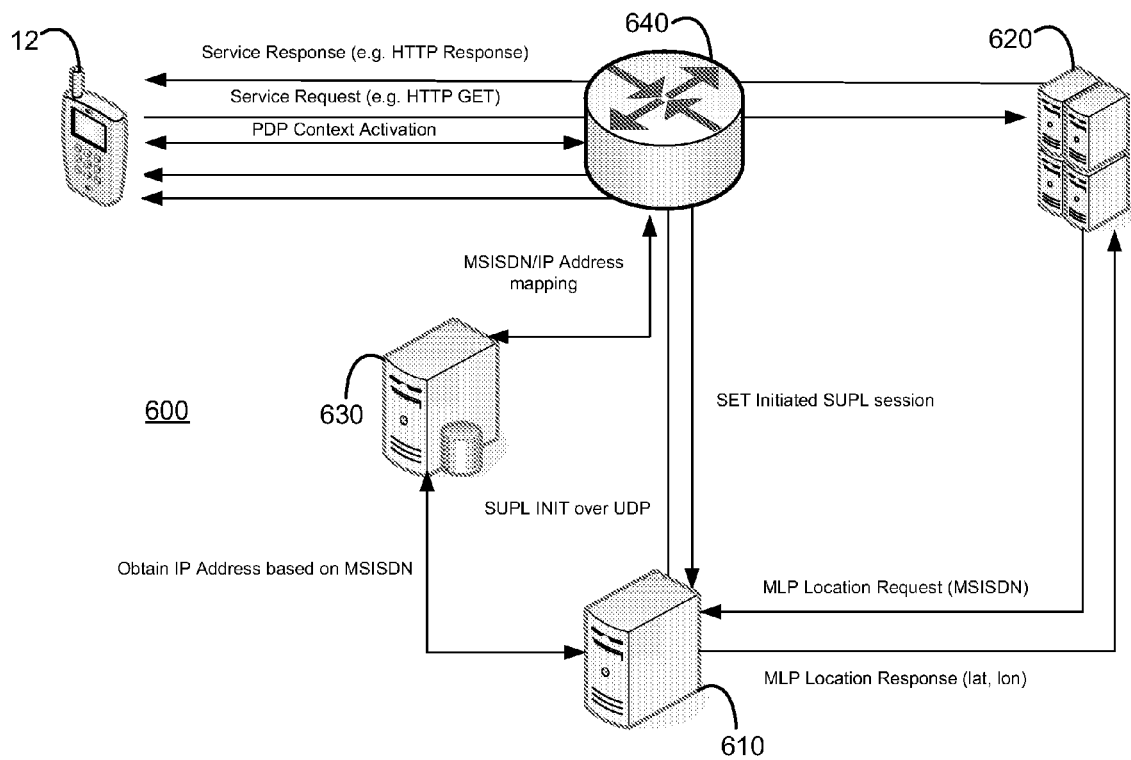
FIG. 6 is a diagram of a system and associated signaling in accordance with various embodiments of the present invention.

FIG. 6 illustrates a system 600 and the associated signaling in accordance with transmitting SUPL INIT messages according to various embodiments. The system 600 can include, but is not limited to a SET, such as a mobile device 12, a SLP 610, an application server 620, an AAA server 630, and a GGSN 640. It should be noted that more or less network elements can be a part of the system, and that more or less signaling sequences can be executed in accordance with various embodiments.

As shown in FIG. 6, when the SET wants to utilize GPRS, the SET 12 attaches and then activates a PDP context. Activation of the PDP context allocates a PDP context data structure in a Serving GPRS Support Node (SGSN) (not shown) and the GGSN 640 serving the access point (not shown) of the SET 12. Mobile Station Integrated Services Digital Network (MSISDN)/IP address mapping is then executed between the GGSN 640 and the AAA server 630. A service request, e.g., a HTTP GET, is then sent from the SET 12 to the application server 620. Thereafter, a MLP location request, which can include the MSISDN of the SET 12, is sent from the application server 620 to the SLP 610. The SLP 610 and the AAA server 630 interact, resulting in the SLP 610 obtaining the IP address of the SET 12 based on the MSISDN. The SUPL INIT message is then sent over UDP directly to the GGSN 640, as described above. In turn, a SET-initiated SUPL session is commenced. A MLP location response including the latitude (lat) and longitude (lon) position of the SET 12 is transmitted from the SLP 610 to the application server 620. The application server 620 can then send a service response, e.g., HTTP response, to the SET 12. It should be noted that more or less of the operations described above can occur, depending for example, upon processes executed in accordance with one or another embodiment.

When transmitting SUPL initiation messages from a SLP to a SET in accordance with various embodiments, a faster SUPL procedure results, which in turn results in faster location information delivery in the case of network-initiated SUPL location requests. In addition, a user's experience is enhanced. Various embodiments can be realized as software-only implementations, as opposed to features necessitating hardware modification/implementation. In addition, it may be noted that standards support may be needed, although this amounts to only a minor change. For example, various embodiments can be implemented as an optional extension to conventional SUPL features. Furthermore, various embodiments may require that the SET has an IP connection with an application server, as described above. However, it is likely that the SET already has an IP connection when a network-based application requires the location of a SET.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   determining to execute a first procedure or a second procedure,
   wherein the first procedure comprises receiving a first request including an indication of an available general packet radio service session, determining to transmit a second request to start a secure user plane location-enabled terminal initiated location procedure, and determining a position of the secure user plane location-enabled terminal,
   the second procedure comprises receiving an internet protocol address of the secure user plane location enabled terminal and determining to transmit another request to start a secure user plane location-enabled terminal initiated location procedure utilizing a user datagram protocol, and
   the second request and the another request include a request to deliver the position of the secure user plane location-enabled terminal to an application server used as a proxy for the sending of the second request and the another request.

2. The method of claim 1 further comprising, establishing an internet protocol connection utilizing general packet radio services with the secure user plane location-enabled terminal prior to at least one of the receiving of the first request and the receiving of the internet protocol address of the secure user plane location-enabled terminal.

3. The method of claim 1, wherein the indication is configured to inform a location platform of the available general packet radio service session between a location services application and the secure user plane location-enabled terminal.

4. The method of claim 1, wherein the first request comprises a mobile location protocol standard location immediate request.

5. The method of claim 1, wherein the second request and the another request comprise a secure user plane location initiation message.

6. The method of claim 1 further comprising, receiving at least one of a hypertext transfer request and a wireless application protocol request including the position of the secure user plane location-enabled terminal and completing a location service.

7. The method of claim 1 further comprising, determining from an authentication, authorization, and accounting server the secure user plane location-enabled terminal has an active internet protocol connection prior to the receiving of the internet protocol address of the secure user plane location-enabled terminal.

8. The method of claim 7, wherein the determining is performed by a location platform.

9. The method of claim 8, wherein the location platform performs the transmitting of the secure user plane location request utilizing a user datagram protocol to a gateway general packet radio service support node.

10. The method of claim 9, wherein any messages from the location platform to the secure user plane location-enabled terminal are allowed by any firewall on a communications path located therebetween.

11. A computer program product, embodied on a non-transitory computer-readable medium, comprising computer code configured to perform the processes of claim 1.

12. An apparatus, comprising:
a processor; and
a memory unit operatively connected to the processor and including:
computer code configured to perform:
a determining to execute a first procedure or a second procedure,
wherein the first procedure comprises receiving a first request including an indication of an available general packet radio service session, determining to transmit a second request to start a secure user plane location-enabled terminal initiated location procedure, and determining a position of the secure user plane location-enabled terminal,
the second procedure comprises receiving an internet protocol address of the secure user plane location-enabled terminal and determining to transmit another request to start a secure user plane location-enabled terminal initiated location procedure utilizing a user datagram protocol, and
the second request and the another request include a request to deliver the position of the secure user plane location-enabled terminal to an application server used as a proxy for the sending of the second request.

13. The apparatus of claim 12, wherein the memory unit further comprises computer code configured to establish an internet protocol connection using general packet radio services with the secure user plane location-enabled terminal prior to at least one of receiving the first request and receiving the internet protocol address of the secure user plane location-enabled terminal.

14. The apparatus of claim 12, wherein the indication is configured to inform a location platform of the available general packet radio service session between a location services application and the secure user plane location-enabled terminal.

15. The apparatus of claim 12, wherein the first request comprises a mobile location protocol standard location immediate request.

16. The apparatus of claim 12, wherein the second request and the another request comprise a secure user plane location initiation message.

17. The apparatus of claim 12, wherein the memory unit further comprises computer code configured to receive at least one of a hypertext transfer request and a wireless application protocol request including the position of the secure user plane location-enabled terminal and complete a location service.

18. The apparatus of claim 12, wherein the memory unit further comprises computer code configured to determine from an authentication, authorization, and accounting server the secure user plane location-enabled terminal has an active internet protocol connection prior to receiving the internet protocol address of the secure user plane location-enabled terminal.

19. The apparatus of claim 18, wherein the determining is performed by a location platform.

20. The apparatus of claim 19, wherein the location platform comprises computer code configured to transmit the secure user plane location request utilizing a user datagram protocol to a gateway general packet radio service support node.

21. A system, comprising:
a location platform configured to determine to execute a first procedure or a second procedure;
an application server operatively connected to the location platform, the application server configured to (1) transmit a first request including an indication of an available general packet radio service session to the location platform if the first procedure is determined and (2) transmit an internet protocol address of a secure plane location enabled terminal if the second procedure is determined; and
the secure user plane location-enabled terminal configured to (1) receive a second request from the location platform to start a secure user plane location-enabled terminal initiated location procedure if the first procedure is determined, wherein a position of the secure user plane location-enabled terminal is determined by the location platform and (2) receive another request from the location platform to start a secure user plane location-enabled terminal initiated location procedure utilizing a user datagram protocol,
wherein the second request and the another request include a request to deliver the position of the secure user plane location-enabled terminal to the application server used as a proxy for the sending of the second request.

22. The system of claim 21, wherein an internet protocol connection is established between the secure user plane location-enabled terminal and the application server prior to the receiving of the first request.

23. A system, comprising:
- a location platform configured to determine to execute a first procedure or a second procedure,
- an authentication, authorization, and accounting server configured to transmit an internet protocol address of a secure user plane location-enabled terminal to the location platform if the second procedure is determined;
- a gateway general packet radio service support node configured to receive a request and transmit the request utilizing a user datagram protocol to the secure user plane location-enabled terminal to determine a position of the secure user plane location-enabled terminal if the first procedure is determined
- an application server communicatively connected to the secure user plane location-enabled terminal via an internet protocol connection and configured to transmit another request including an indication of an available general packet radio service session to the location platform; and
- the secure user plane location-enabled terminal, wherein the secure use plane location-enabled terminal is configured to receive the another request from the location platform to start a secure user plane location-enabled terminal initiated location procedure, wherein a position of the secure user plane location-enabled terminal is determined by the location platform,
- wherein the second request and the another request include a request to deliver the position of the secure user plane location-enabled terminal to the application server used as a proxy for the sending of the second request.

24. The system of claim 23, wherein any messages from the location platform to the secure user plane location-enabled terminal are allowed by any firewall on a communications path located therebetween.

* * * * *